(12) United States Patent
Hu

(10) Patent No.: US 9,842,364 B2
(45) Date of Patent: Dec. 12, 2017

(54) DETERMINING TRANSACTION STATUS INFORMATION CORRESPONDING TO INSTANT MESSAGING CONTACT PERSONS

(71) Applicant: Alibaba Group Holding Limited, George Town (KY)

(72) Inventor: Ke Hu, Hangzhou (CN)

(73) Assignee: Alibaba Group Holding Limited (KY)

( * ) Notice: Subject to any disclaimer, the term of this patent is extended or adjusted under 35 U.S.C. 154(b) by 955 days.

(21) Appl. No.: 13/963,823

(22) Filed: Aug. 9, 2013

(65) Prior Publication Data
US 2014/0046805 A1    Feb. 13, 2014

(30) Foreign Application Priority Data
Aug. 13, 2012  (CN) .......................... 2012 1 0287697

(51) Int. Cl.
G06Q 30/00  (2012.01)
G06Q 30/06  (2012.01)
H04L 12/58  (2006.01)

(52) U.S. Cl.
CPC ......... *G06Q 30/0635* (2013.01); *H04L 51/02* (2013.01)

(58) Field of Classification Search
CPC ...................................... G06Q 30/00
USPC ................. 705/26.1–27.2, 26, 27
See application file for complete search history.

(56) References Cited

U.S. PATENT DOCUMENTS

| | | | |
|---|---|---|---|
| 7,451,102 B2 | 11/2008 | Nowak | |
| 7,881,964 B2 * | 2/2011 | Burger | G06Q 30/0226 705/14.27 |
| 8,290,819 B2 | 10/2012 | Bawcutt | |
| 8,762,205 B2 * | 6/2014 | Narayanaswami | G06Q 10/107 705/14.45 |
| 2002/0172164 A1 * | 11/2002 | Chou | H04L 1/1671 370/282 |
| 2002/0178087 A1 | 11/2002 | Henderson et al. | |
| 2003/0195811 A1 * | 10/2003 | Hayes, Jr. | G06Q 10/10 705/26.41 |
| 2004/0249691 A1 * | 12/2004 | Schell | G06Q 10/06311 705/7.13 |
| 2005/0108349 A1 | 5/2005 | Sorensen | |

(Continued)

FOREIGN PATENT DOCUMENTS

| | | |
|---|---|---|
| JP | 2002083247 A | 3/2002 |
| JP | 2003044700 A | 2/2003 |

(Continued)

OTHER PUBLICATIONS

Got a Question? Information Week, Oct. 12, 2006; ProQuest Dialog #152721212, 3pgs.*

(Continued)

*Primary Examiner* — Rob Pond
(74) *Attorney, Agent, or Firm* — Van Pelt, Yi & James LLP

(57) ABSTRACT

Determining transaction status information is disclosed, including: sending a transaction status information query request corresponding to a contact person associated with an instant messaging client, wherein the transaction status information query request is associated with a user with respect to the contact person, wherein the user is associated with the instant messaging client; and receiving transaction status information determined based at least in part on the transaction status information query request corresponding to the contact person, wherein the transaction status information describes a current stage in a fulfillment process of an order.

15 Claims, 15 Drawing Sheets

(56) References Cited

U.S. PATENT DOCUMENTS

| | | | |
|---|---|---|---|
| 2006/0085276 A1 | 4/2006 | Hoech et al. | |
| 2006/0156063 A1 | 7/2006 | Mazzarella | |
| 2006/0167729 A1* | 7/2006 | Rafter | G06Q 10/00 705/7.16 |
| 2007/0016490 A1* | 1/2007 | Nowak | G06Q 10/087 705/26.35 |
| 2007/0192442 A1 | 8/2007 | Bushee et al. | |
| 2008/0133659 A1* | 6/2008 | Aldrey | G06Q 30/0601 709/204 |
| 2008/0275788 A1 | 11/2008 | Altberg et al. | |
| 2008/0294447 A1 | 11/2008 | Steiner | |
| 2009/0187623 A1* | 7/2009 | Narayanaswami | G06Q 10/107 709/204 |
| 2009/0210312 A1 | 8/2009 | Frey et al. | |
| 2011/0016516 A1* | 1/2011 | Mo | H04L 12/581 726/7 |
| 2012/0116790 A1 | 5/2012 | Pitroda et al. | |

FOREIGN PATENT DOCUMENTS

| | | |
|---|---|---|
| JP | 2009211583 | 9/2009 |
| JP | 2009211583 A | 9/2009 |
| JP | 3173451 B | 1/2012 |

OTHER PUBLICATIONS

"eBay completes eCommerce triad: click to buy, click to pay, click to call," Online Reporter Sep. 17, 2005; ProQuest Dialog #137015551, 5pgs.*

* cited by examiner

1300

```
┌─────────────────────────────────────────┐
│ Receive at an instant messaging server  │
│ a transaction status information query  │
│ request corresponding to a contact      │
│ person sent by an instant messaging     │──1302
│ client, wherein the transaction status  │
│ information query request is associated │
│ with a user associated with the instant │
│ messaging client with respect to the    │
│ contact person                          │
└─────────────────────────────────────────┘
                     │
                     ▼
┌─────────────────────────────────────────┐
│ Determine transaction status information│
│ corresponding to the contact person     │──1304
│ based at least in part by querying a    │
│ transaction status database             │
└─────────────────────────────────────────┘
                     │
                     ▼
┌─────────────────────────────────────────┐
│ Send the transaction status information │──1306
│ corresponding to the contact person to  │
│ the instant messaging client            │
└─────────────────────────────────────────┘
```

FIG. 13

DETERMINING TRANSACTION STATUS INFORMATION CORRESPONDING TO INSTANT MESSAGING CONTACT PERSONS

CROSS REFERENCE TO OTHER APPLICATIONS

This application claims priority to People's Republic of China Patent Application No. 201210287697.6 entitled INSTANT MESSAGING CLIENT, INSTANT MESSAGING SERVER AND INSTANT MESSAGING METHOD, filed Aug. 13, 2012 which is incorporated herein by reference for all purposes.

FIELD OF THE INVENTION

The present application relates to the field of instant messaging technology. In particular, the present application relates to techniques of using an instant messaging client to display transaction status information.

BACKGROUND OF THE INVENTION

Instant messaging (which is also sometimes referred to as "IM") technology is often used in electronic commerce (e-commerce) applications. Instant messaging technology has gradually expanded from its former role as a chatting and file transfer tool to an indispensable communication tool for e-commerce transactions. For example, at an e-commerce website seller users submit product information of products they are selling to the website and buyer users may select to purchase such products. Seller users and buyer users may each download and install an instant messaging client application related to the e-commerce website so that they may communicate to each other via such client applications. For example, a buyer user may chat with a seller user over the instant messaging client application installed at the buyer user's device to ask questions about a product that the seller user is selling.

As online transactions have increased in number, it has grown increasingly difficult for seller users to manually keep track of the transaction status information of each buyer user with whom it is doing business. In order to better communicate with buyer users, it is beneficial for seller users generally to know the transaction status information of the buyer users that the seller users are currently chatting with over an instant messaging service. This transaction status information for a transaction (or order) changes continually as the order proceeds to be fulfilled. For example, a transaction order may be identified based on one or more of the following: seller user ID, buyer user ID, product information, and the order code. The transaction status information may progress through the following example stages: Ordered→Paid→Shipped→Delivery confirmed→Evaluated, etc. As an order is being fulfilled, the transaction status information associated with the order is updated over time at a transaction server of the e-commerce website.

Typically, if a seller user wishes to know the transaction status information concerning a certain order, the seller user must log onto a website (or other web-based portal) of the transaction server corresponding to an e-commerce website to send a query for the current transaction status information of the order. Therefore, the seller user would need to simultaneously utilize or frequently switch between the instant messaging application and the website of the transaction server in order to determine the current transaction status information for the orders associated with the buyer users that the seller user is associated with (e.g., communicating with) over the instant message application. This is particularly true when the seller user is holding a promotional activity and therefore is communicating with a large number of buyer users at the same time or within a short window of time. The juggling between using the instant messaging application and the website associated with the transaction server will not only increase the visit load on both the transaction server and the instant messaging server, but also greatly reduce the seller user's work efficiency. In particular, when the transaction server is unable to respond promptly due to an excess in visit load, the seller user will not be able to acquire transaction status information promptly or subsequently return such transaction status information to the buyer users. This not only reduces the efficiency of instant messaging for the users, but also diminishes their user experience.

BRIEF DESCRIPTION OF THE DRAWINGS

Various embodiments of the invention are disclosed in the following detailed description and the accompanying drawings.

FIG. 13 is a flow diagram showing an embodiment of a process for determining transaction status information.

DETAILED DESCRIPTION

Figure 1:
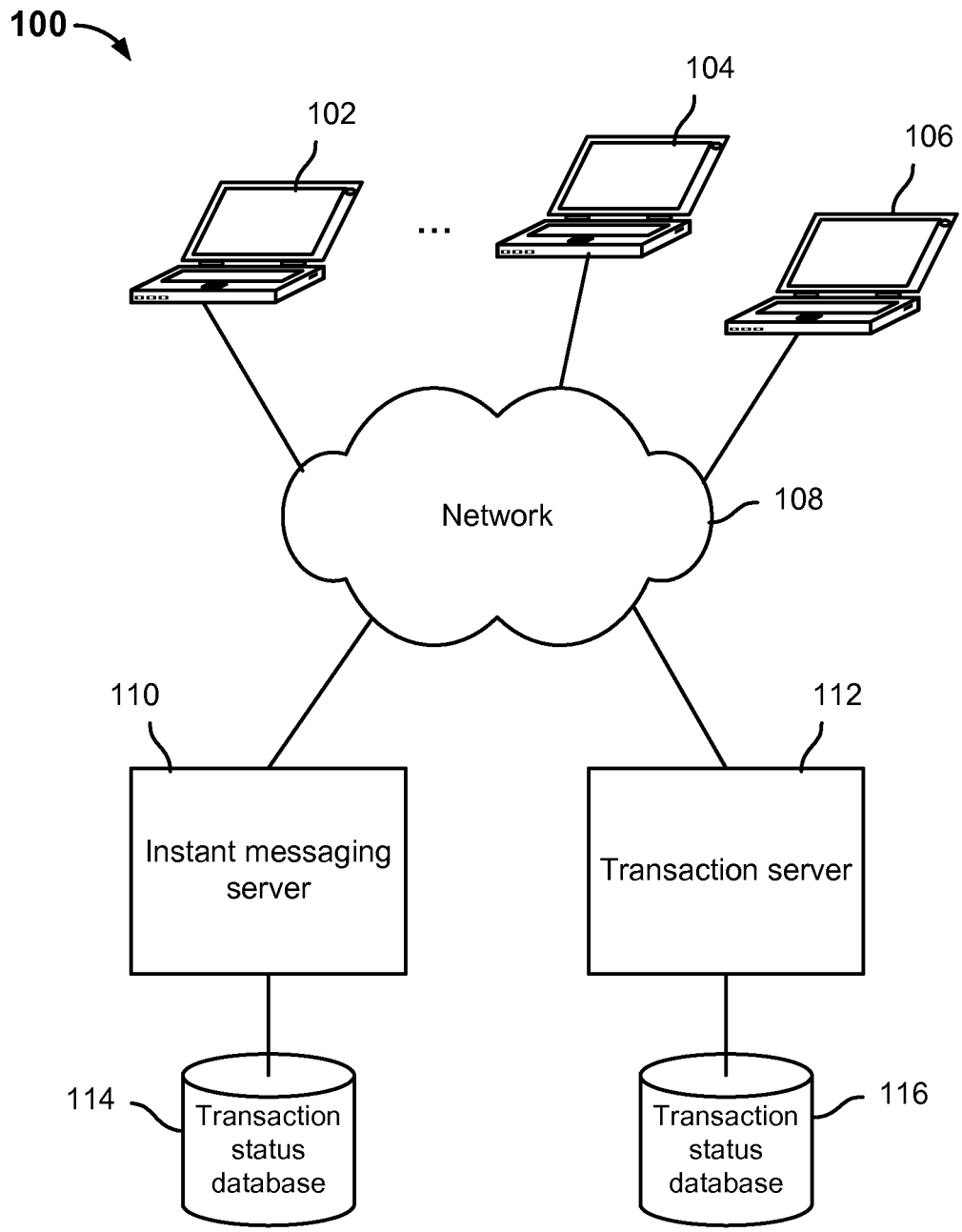
FIG. 1 is a diagram of a system for determining transaction status information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Communication between a seller user and a buyer user and the generation of transaction status information are both important elements of an online transaction. There are typically two portals available to the seller user to use in communicating with buyer users and in queries associated with transaction status information of various orders by the buyer users. The first portal is via an instant messaging server and the second portal is via a transaction server. The instant messaging server is primarily associated with providing an instant messaging service and the transaction server is primarily associated with tracking the status information of transactions performed (or orders made) at one or more e-commerce websites. Therefore, a typical online transaction flow process often requires the seller user to switch frequently between using an instant messaging client to access the instant messaging server and to query the transaction server for current transaction status information corresponding to one or more buyer users. Having the seller user switch frequently between the instant messaging server and the transaction server not only increases the visit load on both the instant messaging server and the transaction server, but also reduces the efficiency of instant messaging.

Embodiments of determining transaction status information corresponding to instant messaging contact persons are described herein. In various embodiments, the transaction status information describes a current stage in the fulfillment process of an order made by a buyer user with a seller user at an e-commerce website. The seller user may communicate with one or more buyer users using an instant messaging client executing at a client device used by the seller user. In some embodiments, the instant messaging client comprises an instant messaging application. The one or more buyer users that have established instant messaging sessions (e.g., buyer users that are connected) with the seller user will appear as contact persons in a contact person list of the instant messaging client. In various embodiments, the instant messaging client is configured to automatically send a transaction status information query request corresponding to each connected contact person (e.g., the buyer user). In some embodiments, the instant messaging client sends the transaction status information query request to a transaction server. In some embodiments, the instant messaging client sends the transaction status information query request to an instant messaging server. In various embodiments, the instant messaging client receives the current transaction status information corresponding to each contact person from either the transaction server or the instant messaging server. In various embodiments, the instant messaging client is configured to display the received transaction status information corresponding to a contact person in the instant messaging window associated with the instant messaging client such that the seller user can easily learn of the transaction status information associated with the connected contact person.

FIG. 1 is a diagram of a system for determining transaction status information. In the example, system 100 includes client device 102, client device 104, client device 106, network 108, instant messaging server 110, transaction status database 114, transaction server 112, and transaction status database 116. Network 108 includes high-speed data networks and/or telecommunications networks.

Each of client device 102, client device 104, and client device 106 is configured to communicate with instant messaging server 110 and/or transaction server 112. An instant messaging client is executing at each of client device 102, client device 104, and client device 106. The instant messaging client enables each of client device 102, client device 104, and client device 106 to use the instant messaging service provided by instant messaging server 110. While client device 102, client device 104, and client device 106 is each shown to be a laptop computer, other examples of client device 102, client device 104, and client device 106 include a desktop computer, a mobile device, a tablet device, a smart phone, and/or any other computing device. Each of client device 102, client device 104, and client device 106 includes an input interface (e.g., a physical keyboard or touchscreen) through which a user may input characters and also a display interface at which information may be displayed for the user.

In the example, assume that a seller user is using the instant messaging client of client device 102 and a different buyer user is using the instant messaging client of each of client device 104 and client device 106. The buyer users using the instant messaging clients of client device 104 and client device 106 become interested in products that are being sold by the seller user and therefore initiate instant messaging sessions with the seller user of client device 102. Therefore, the two buyer users each becomes a connected contact person with the seller user in the instant messaging client of the seller user executing at client device 102. The instant messaging client executing at client device 102 is configured to send a first transaction status information query request corresponding to the buyer user associated with client device 104 and a second transaction status information query request corresponding to the buyer user associated with client device 106.

In some embodiments, the instant messaging client executing at client device 102 is configured to send the transaction status information query requests to transaction server 112. Transaction server 112 is configured to track the current transaction status information corresponding to various seller users with respect to various buyer users of an e-commerce website in transaction status database 116, which is maintained by transaction server 112. In the event that the transaction status information query requests were sent to transaction server 112, transaction server 112 is configured to query transaction status database 116 for the current transaction status information associated with the seller user of client device 102 with respect to each of the buyer user of client device 104 and the buyer user of client device 106. Transaction server 112 is configured to send the determined current transaction status information associated with the seller user of client device 102 with respect to each of the buyer user of client device 104 and the buyer user of client device 106 to the instant messaging client of client device 102.

In some embodiments, the instant messaging client executing at client device 102 is configured to send the transaction status information query requests to instant messaging server 110. Instant messaging server 110 is configured to provide the instant messaging service, which may be associated with a particular e-commerce website, maintained by instant messaging server 110. In the event that the transaction status information query requests were sent to instant messaging server 110, in some embodiments, instant messaging server 110 is configured to forward the query request to transaction server 112 for transaction server 112 to query transaction status database 116 for the current transaction status information associated with the seller user of client device 102 with respect to each of the buyer user of client device 104 and the buyer user of client device 106. In some embodiments, instant messaging server 110 is configured to query its own local database, transaction status database 114, for the current transaction status information associated with the seller user of client device 102 with respect to each of the buyer user of client device 104 and the buyer user of client device 106. Instant messaging server 110 is configured to send the determined current transaction status information associated with the seller user of client device 102 with respect to each of the buyer user of client device 104 and the buyer user of client device 106 to the instant messaging client of client device 102.

After the instant messaging client of client device 102 receives the determined current transaction status information associated with the seller user of client device 102 with respect to each of the buyer user of client device 104 and the buyer user of client device 106, such transaction status information is displayed for the seller user in the instant messaging window associated with the instant messaging client at client device 102. This way, the seller user can easily determine the current transaction status information corresponding to each buyer user that it is chatting with using the instant messaging client.

Figure 2:
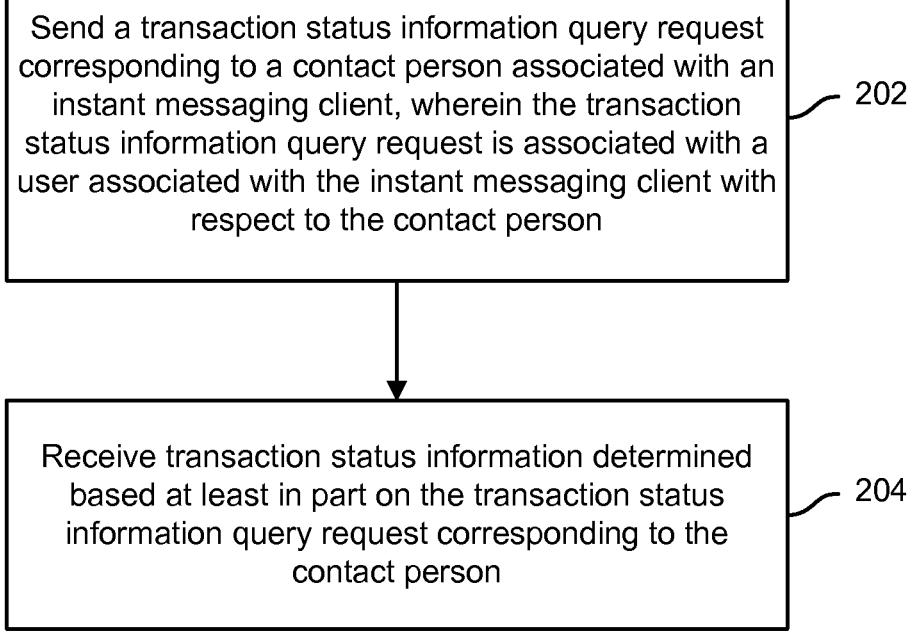
FIG. 2 is a flow diagram showing an embodiment of a process for determining transaction status information.

FIG. 2 is a flow diagram showing an embodiment of a process for determining transaction status information. In some embodiments, process 200 is implemented at system 100 of FIG. 1.

In various embodiments, process 200 is implemented by an instant messaging client executing at a client device used by a seller user of an e-commerce website.

At 202, a transaction status information query request corresponding to a contact person associated with an instant message client is sent, wherein the transaction status information query request is associated with a user associated with the instant messaging client with respect to the contact person. For example, a seller user who is selling products over an e-commerce website may establish an instant messaging account and download an instant messaging client related to the e-commerce website to a client device. The instant messaging client may comprise an application that is configured to provide instant messaging services to the client user. Instant messaging services may include maintaining a contact list of other users. For example, the instant message client may be downloaded from the e-commerce website or obtained via other appropriate means. In various embodiments, the seller user is the user associated with the instant message client and is sometimes referred to as the "client user."

In various embodiments, a contact person associated with the instant messaging client is a buyer user who has potentially performed an online transaction with the seller user. A contact person may be a buyer user for whom the seller user has maintained identifying information associated with the instant messaging service. In some embodiments, a transaction status information query request corresponding to each contact person is sent by the instant messaging client of the seller user only if the contact person (the buyer user) is currently connected with the seller user over the instant messaging service. A connected contact person is a buyer user who has established an instant messaging session with the seller user over the instant messaging service. For example, a buyer user may establish an instant messaging session with the seller user by making one or more selections at the instant messaging client executing at the buyer user's client device to start a chat session with the seller user. For example, the buyer user may initiate an instant messaging session with the seller user to ask questions about the products sold by the seller user and/or inquire about a particular order that the buyer user has made with the seller user. For example, the seller user may initiate an instant messaging session with the buyer user to communicate product information to the buyer user and/or send out advertisements.

Generally, an instant messaging session may be established between the client user (the seller user) and a buyer user based on two primary embodiments. In the first embodiment, identifying information associated with the contact person is found in the client user's stored contact list of the client user's instant messaging client. A contact person list may be used to record each contact person that is currently connected with the client user (the seller user) via the instant messaging client. For example, the client user may initiate an instant messaging session with a contact person by selecting identifying information associated with that contact person on the contact list. In the second embodiment, the identifying information associated with the contact person is not found in the client user's contact list, but the client user has directly sent a message to the instant messaging account of the contact person, which will cause identifying information associated with the contact person to be added to the contact list. If a client user shuts down a window associated with the instant messaging session with a connected contact person or deletes a contact person from the contact person list, then the affected contact person is removed from the contact person list. Or, if a client user opens an instant messaging window to communicate with a contact person or adds a contact person to the contact person list, then the affected contact person is considered to be added to the contact person list.

In some embodiments, a transaction status information query request that corresponds to a contact person is sent by the instant messaging client of the seller user and includes identifying information associated with the client user (the seller user) and identifying information of the contact person. In some embodiments, other information in addition to the identifying information associated with the client user (the seller user) and identifying information of the contact person are included in the query request. In some embodiments, a transaction status information query request corresponding to each connected contact person of the seller user is sent by the instant messaging client.

At 204, transaction status information determined based at least in part on the transaction status information query request corresponding to the contact person is received. Transaction status information that indicates the transaction status information of a current order with respect to the contact person (e.g., a buyer user) and the client user (e.g., the seller user) is received at the instant message client. In various embodiments, the transaction status information is determined by querying a transaction status database based on the identifying information associated with the client user (e.g., the seller user) and identifying information of the contact person that was included in the query request. In various embodiments, a transaction status database keeps track of the current progress of each transaction (e.g., order) between various seller users and buyer users associated with an e-commerce website. For example, an entry of the transaction status database may include the current status of a transaction (also referred to as the transaction status information), the seller user associated with the transaction, the buyer user associated with the transaction, the last time at which the current status of the transaction was updated, and an order number. In some embodiments, when the progress of a transaction (e.g., the order fulfillment process) changes to the next stage, the corresponding entry at the transaction status database is updated.

For example, the progression of transaction status information from when the order is first placed to when reviews are submitted for the fulfilled order includes the following stages: Ordered→Paid→Shipped→Delivery confirmed→Evaluated by a buyer user→Evaluated by both parties. Descriptions associated with the various stages are as follows:

Prior to "Ordered": The buyer user (the contact person) first connects with the seller user (the client user) via an instant messaging window associated with a product page that includes a product that is sold by the seller user in order to inquire about a product that the buyer user has not yet purchased. At this point, since no transaction has occurred, there is no transaction data associated with the seller user with respect to the contact person in the transaction database. Therefore, the corresponding transaction status information associated with the seller user and this buyer user does not (yet) exist.

"Ordered": After the buyer user orders the product sold by the seller user, an "Ordered" transaction message is sent to the transaction status database, and the entry associated with the seller user with respect to the buyer user will be recorded in the transaction status database. At this point, the current transaction status information associated with the seller user with respect to the buyer user is updated to be "Ordered."

"Paid": If, after the product has been ordered, the buyer user successfully makes payment, then a "Paid" transaction message is sent to the transaction status database, where it is used to update the current transaction status information associated with the seller user with respect to the buyer user. The current transaction status information associated with the seller user with respect to the buyer user is updated to be "Paid."

"Shipped": If, after the buyer user makes payment, the seller user ships the goods to the buyer, then a "Shipped" transaction message will be sent to the transaction status database, where it is used to update the current transaction status information associated with the seller user with respect to the buyer user. The current transaction status information associated with the seller user with respect to the buyer user is updated to be "Shipped."

"Delivery confirmed": If, after the seller user has shipped the product, the buyer user receives it and confirms delivery on the e-commerce website, then a "Delivery confirmed" message will be sent to the transaction status database, where it is used to update the current transaction status information associated with the seller user with respect to the buyer user. The current transaction status information associated with the seller user with respect to the buyer user is updated to be "Delivery confirmed."

"Evaluated by the buyer user": If, after the buyer user confirms delivery of the product, he or she evaluates it on the e-commerce website (e.g., by submitting a review of the product and/or seller user), then an "Evaluated by the buyer user" transaction message will be sent to the transaction status database, where it is used to update the current transaction status information associated with the seller user with respect to the buyer user. The current transaction status information associated with the seller user with respect to the buyer user is updated to be "Evaluated by the buyer user."

"Evaluated by both parties": If, after the buyer user provides an evaluation, the seller user also makes an evaluation, then an "Evaluated by both parties" transaction message will be sent to the transaction status database, where it is used to update the current transaction status information associated with the seller user with respect to the buyer user. The current transaction status information associated with the seller user with respect to the buyer user is updated to be "Evaluated by both parties."

The order of the evaluations by the buyer user and by the seller user as described above in the different stages of an order fulfillment process may be reversed.

As described above, an instant messaging client described herein may, after acquiring a connection with a contact person, automatically trigger a transaction status information query request to be sent for the corresponding connected contact person. For example, prior to the buyer user making an order, the buyer user initiates an instant messaging session with the virtual shop owner (the client user) through a product page on the e-commerce website in order to seek information about a product sold by the client user. At this point, because the buyer user has already established an instant messaging connection with the client user, the buyer user may be regarded as a connected contact person, and an appropriate transaction status information query request is automatically triggered to be sent by the instant messaging client. The transaction status information query request may include identifying information associated with the shop owner (the seller user) and identifying information associated with the connected contact person so that such information may be used to look up in the transaction status database the current transaction status information between the shop owner and the connected contact person.

Based on the transaction status information returned to the instant messaging client for a particular buyer user (contact person), the seller user can use the transaction status information to make a rapid assessment of the transaction status information between it and the buyer user. This can reduce the need for the operations by either seller users or buy users to log onto the e-commerce website to inquire about transaction status information. Thus, using instant messaging clients to automatically send query requests for transaction status information can effectively improve instant messaging efficiency.

Whereas conventionally, a seller user needs to switch frequently between using instant messaging software and checking the e-business website in order to communicate to buyer users regarding queries over transaction status information, embodiments described herein automatically determine the current transaction status information associated with the seller user and each of various buyer users based on identifying information associated with the client user and identifying information associated with each connected contact person. Therefore, frequent switching between visiting the transaction server and the instant messaging server may be reduced and the visit load on the transaction server and on the instant messaging server may also be reduced. Embodiments described herein allow a seller user who is conducting transactions online to also engage in communications and acquire transaction status information for its various buyers through the same portal (e.g., the instant messaging client). Thus, the seller user may prioritize instant messaging sessions with different buyer users based on the transaction status information corresponding to the buyer users. This reduces instant messaging wait time for buyer users.

In various embodiments, a transaction status information query request corresponding to a contact person is periodically sent by the instant messaging client so that the instant messaging client may receive the most current transaction status information associated with an order as the order is fulfilled over time.

Figure 3:
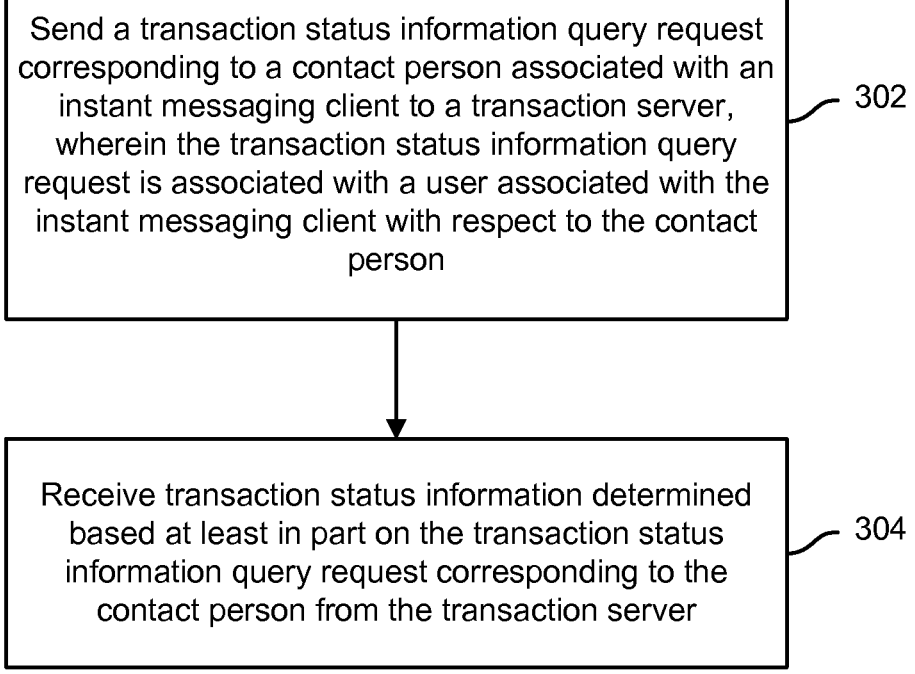
FIG. 3 is a flow diagram showing an embodiment of a process for determining transaction status information.

FIG. 3 is a flow diagram showing an embodiment of a process for determining transaction status information. In some embodiments, process 300 is implemented at system 100 of FIG. 1. In some embodiments, process 200 of FIG. 2 is implemented using process 300.

Process 300 is similar to process 200 of FIG. 2, but process 300 describes an example in which the transaction status information query request corresponding to a contact person is sent specifically to a transaction server.

At 302, a transaction status information query request corresponding to a contact person associated with an instant message client is sent to a transaction server, wherein the transaction status information query request is associated with a user associated with the instant messaging client with respect to the contact person. In some embodiments, a transaction status information query request that corresponds to a contact person is automatically sent by the instant messaging client of the seller user and includes identifying information associated with the client user (the seller user) and identifying information of the contact person. In process 300, the transaction status information query request is automatically triggered to be sent and processed by the transaction server. The transaction server obtains the current transaction status information associated with the query request by querying a transaction status database based on the identifying information associated with the client user (the seller user) and identifying information of the contact person.

At 304, transaction status information determined based at least in part on the transaction status information query request corresponding to the contact person is received from the transaction server. Transaction status information that indicates the transaction status information of a current order with respect to the contact person (a buyer user) and the client user (the seller user) is received at the instant message client. In process 300, the current transaction status information to send in response to a query request is determined by the transaction server querying a transaction status database maintained by the transaction server using the identifying information associated with the client user (the seller user) and identifying information of the contact person included in the query request.

The obtained current transaction status information determined for the query request is sent back to the instant messaging client by the instant messaging server.

Transaction status information recorded in the transaction status database at the transaction server is updated over time based on received messages regarding changes in transaction status information. Therefore, the current transaction status information corresponding to the same contact person that is received by the instant messaging client may change over time as subsequent transaction status information query requests are sent.

Figure 4:
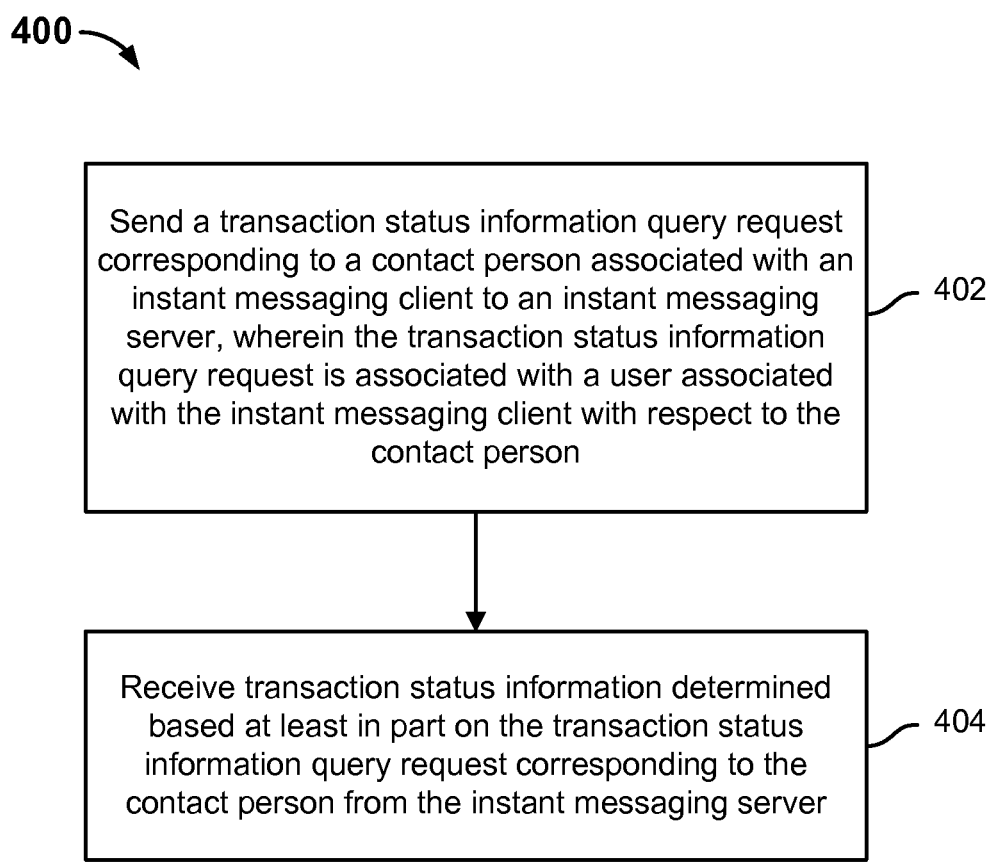
FIG. 4 is a flow diagram showing an embodiment of a process for determining transaction status information.

FIG. 4 is a flow diagram showing an embodiment of a process for determining transaction status information. In some embodiments, process 400 is implemented at system 100 of FIG. 1. In some embodiments, process 200 of FIG. 2 is implemented using process 400.

Process 400 is similar to process 200 of FIG. 2, but process 400 describes an example in which the transaction status information query request corresponding to a contact person is sent specifically to an instant messaging server, which obtains the requested information from a transaction server. In some embodiments, process 400 is implemented alternative to process 300 of FIG. 3.

At 402, a transaction status information query request corresponding to a contact person associated with an instant message client is sent to an instant messaging server, wherein the transaction status information query request is associated with a user associated with the instant messaging client with respect to the contact person. In some embodiments, a transaction status information query request that corresponds to a contact person is automatically sent by the instant messaging client of the seller user and includes identifying information associated with the client user (the seller user) and identifying information of the contact person. In process 400, the transaction status information query request is automatically triggered to be sent to and processed by the instant messaging server.

At 404, transaction status information determined based at least in part on the transaction status information query request corresponding to the contact person is received from the instant messaging server. Transaction status information that indicates the transaction status information of a current order with respect to the contact person (a buyer user) and the client user (the seller user) is received at the instant message client. In process 400, the transaction status information is determined by the instant messaging server querying a transaction status database maintained by the instant messaging server and/or the transaction server using the identifying information associated with the client user (the seller user) and identifying information of the contact person included in the query request. A transaction status database may be maintained by one or both of the instant messaging server and the transaction server or at least is accessible by the instant messaging server and/or the transaction server. The obtained current transaction status information determined for the query request is sent back to the instant messaging client by the instant messaging server.

In process 400, the instant messaging server obtains the current transaction status information associated with a query request by querying a transaction status database using the identifying information associated with the client user and the identifying information associated with the contact person included in the query request. Below are two embodiments of the instant messaging server obtaining the current transaction status information from a transaction status database:

Embodiment 1

The instant messaging server forwards the transaction status information query request that it received from the instant messaging client to the transaction server. The transaction server then obtains the transaction status information by querying using the identifying information associated with the client user and the identifying information associated with the contact person included in the query request, and then sends the determined transaction status information back to the instant messaging server. Embodiment 1 may be used when the transaction status database is maintained by the transaction server and/or is more easily accessible by the transaction server.

Embodiment 2

Whereas in Embodiment 1, the transaction status database is maintained by the transaction server and/or is more easily accessible by the transaction server, in Embodiment 2, another transaction status database and one that is more local to the instant messaging server is maintained by the instant messaging server and/or is more easily accessible by the instant messaging server. The instant messaging server may then directly process a transaction status information query request from an instant messaging client using the information stored in the local transaction status database. The instant messaging server determines the information to store in the local transaction status database by, for example, periodically sending a batch of information query requests to the transaction server and then storing the transaction status information sent back by the transaction server in response to the query requests with the corresponding identifying information of the seller user and the buyer users in the local transaction status database maintained by the instant messaging server. The instant messaging server may send transaction status information requests based on a configured period of every day, every hour, or every 10 minutes, for example. In a first example, the information query request sent by the instant messaging server to the transaction server may include only identifying information associated with various seller users. In response to receiving an information query request that includes only the identifying information of a seller user from an instant messaging server, the transaction server may query its transaction status database for the transaction status information associated with that seller user with respect to each buyer user that has made an order with the seller user. This way, the transaction status information that is returned to the instant messaging server includes the transaction status information associated with the seller user with respect to each of various buyer users that have made an order with the seller user. In a second example, an information query request sent by the instant messaging server to the transaction server may include the identifying information associated with a particular seller user and the identifying information associated with a particular buyer user. In this case, the transaction server may query its transaction status database for the transaction status information associated with that seller user with respect to that particular buyer user and then send the determined transaction status information back to the instant messaging server.

Either Embodiment 1 or Embodiment 2 may be implemented. In some embodiments, one of Embodiment 1 and Embodiment 2 should be implemented while the other embodiment will be used if the first embodiment fails.

Either process 300 of FIG. 3 (which uses the transaction server) or process 400 of FIG. 4 (which uses the instant messaging server) may be used to determine the transaction status information for transaction status information query requests sent by an instant messaging client, as described below.

Figure 5:
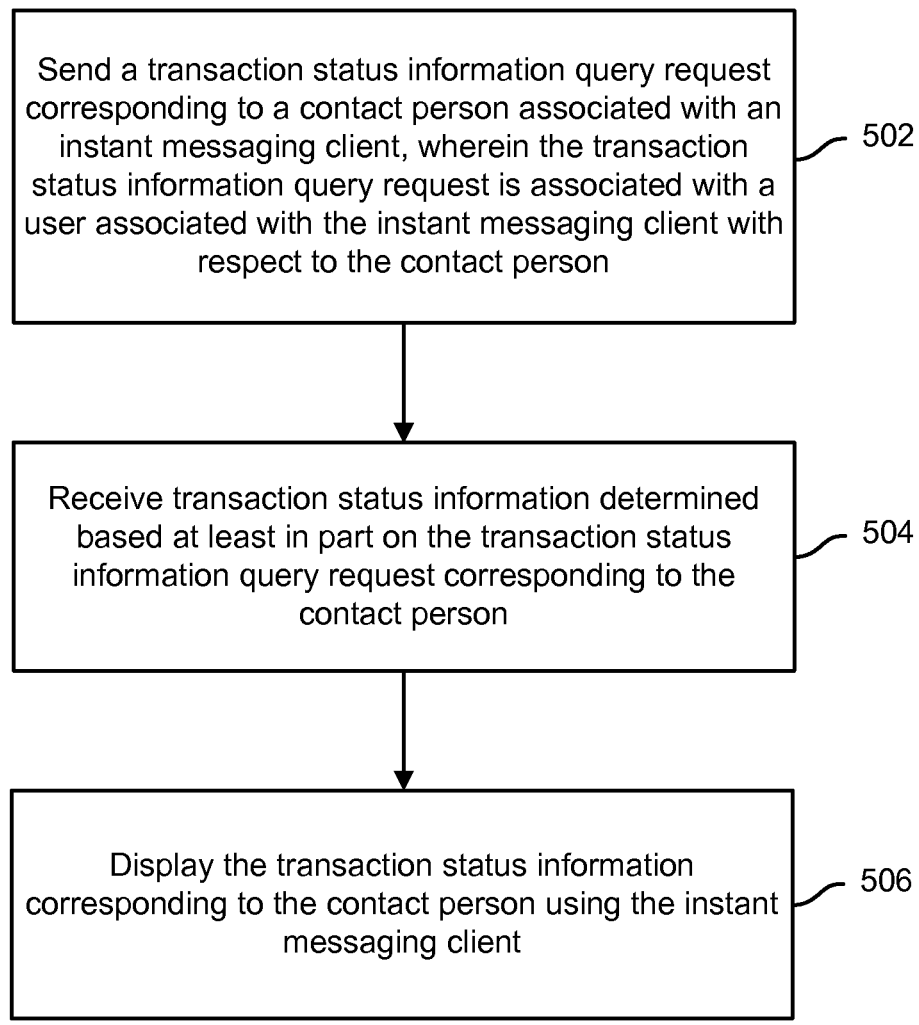
FIG. 5 is a flow diagram showing an embodiment of a process for determining transaction status information.

FIG. 5 is a flow diagram showing an embodiment of a process for determining transaction status information. In some embodiments, process 500 is implemented at system 100 of FIG. 1.

Process 500 is similar to process 200 of FIG. 2, but process 500 describes an example of displaying the transaction status information received at the instant messaging client.

At 502, a transaction status information query request corresponding to a contact person associated with an instant message client is sent, wherein the transaction status information query request is associated with a user associated with the instant messaging client with respect to the contact person.

At 504, transaction status information determined based at least in part on the transaction status information query request corresponding to the contact person is received.

At 506, the transaction status information corresponding to the contact person is displayed by the instant messaging client. In process 500, the received transaction status information received for each contact person is displayed by the instant messaging client for that contact person so that the client user may instantly learn of the current transaction status information associated with each contact person by using the instant messaging service. This way, the client user may prioritize the contact persons with whom it is in communication based on their corresponding current transaction status information. In some embodiments, the received transaction status information is displayed by the instant messaging client of the seller user soon after it is received at the seller user's client device. In some embodiments, the client user may configure one or more parameters (e.g., via a user interface) associated with displaying the transaction status information received for each contact person.

Figure 6:
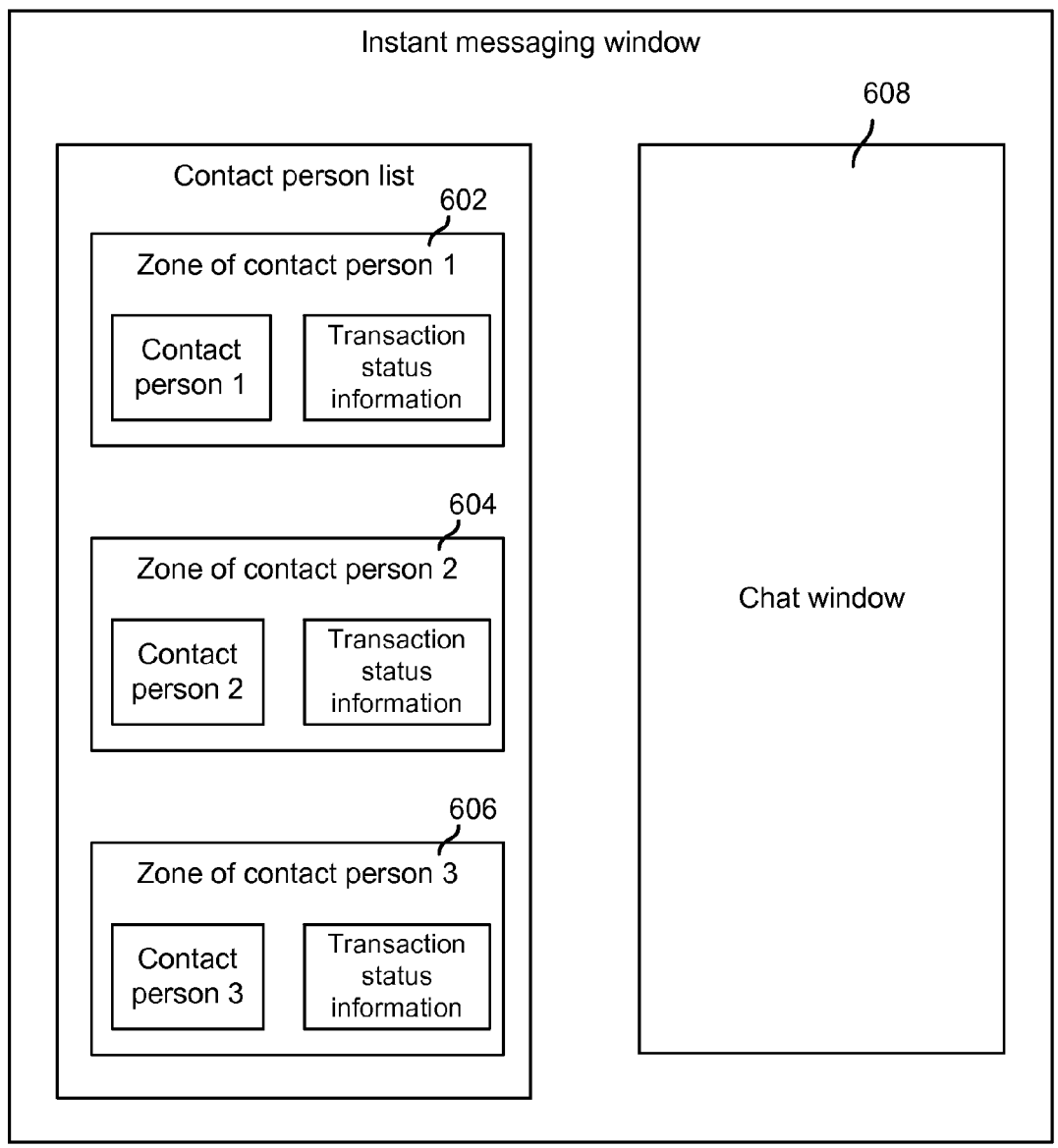
FIG. 6 is a diagram showing a first embodiment of displaying the transaction status information corresponding to various contact persons by an instant messaging client.
Figure 7:
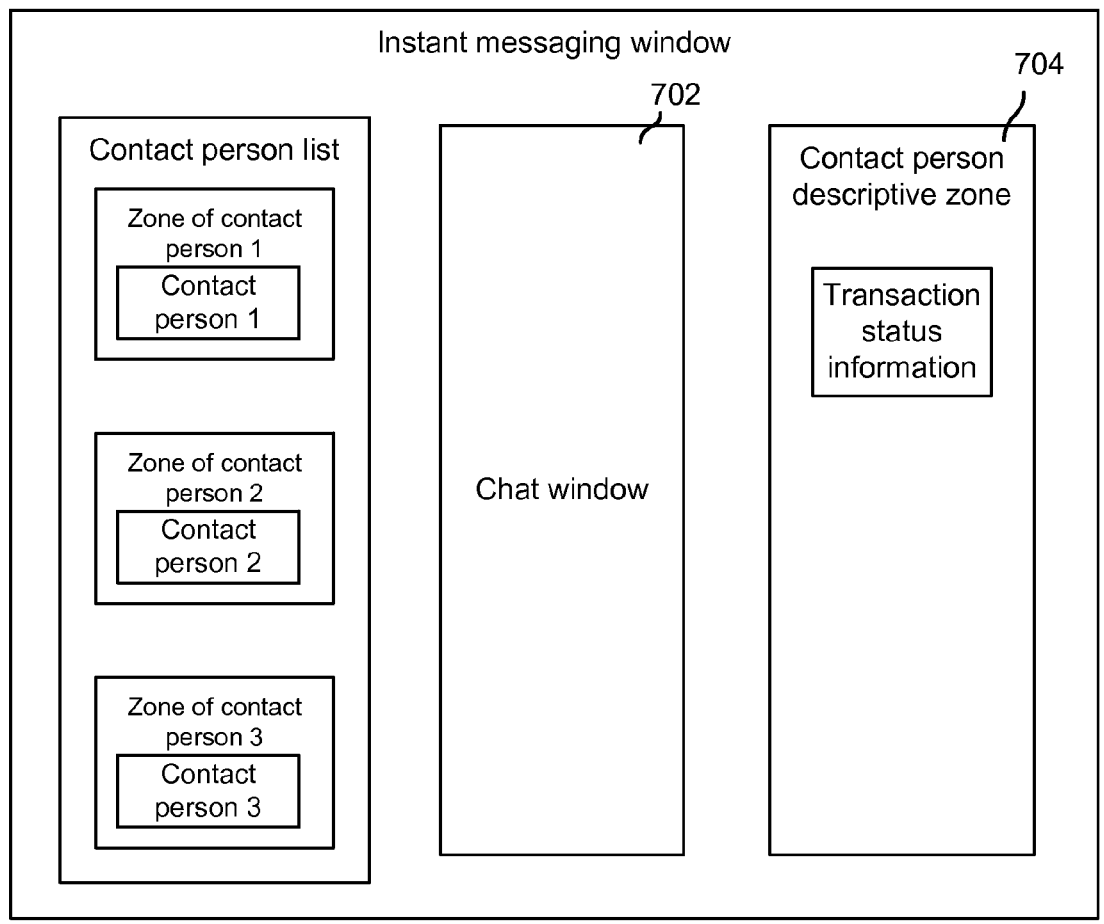
FIG. 7 is a diagram showing a second embodiment of displaying the transaction status information corresponding to various contact persons by an instant messaging client.
Figure 8:
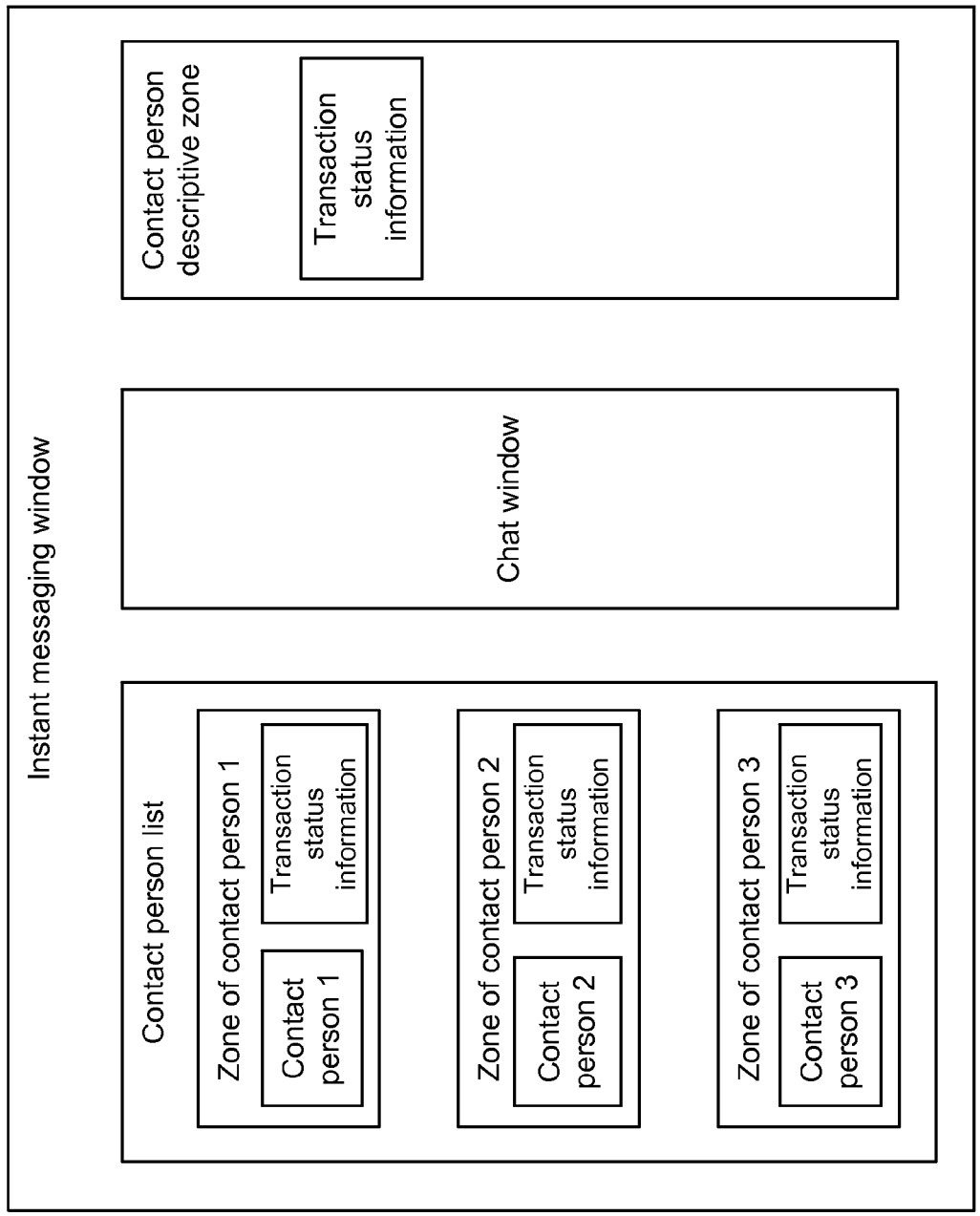
FIG. 8 is a diagram showing a third embodiment of displaying the transaction status information corresponding to various contact persons by an instant messaging client.

FIGS. 6-8 describe some embodiments of displaying the transaction status information corresponding to various contact persons:

FIG. 6 is a diagram showing a first embodiment of displaying the transaction status information corresponding to various contact persons by an instant messaging client. In some embodiments, 506 of process 500 of FIG. 5 is implemented using the embodiment described in FIG. 6.

The example in FIG. 6 shows an instant messaging window that is provided by an instant messaging client. The instant messaging window shown in the example represents at least a portion of the user interface associated with the instant messaging client. For example, the instant messaging client is executing at a client user's (a seller user's) client device. As shown in the example, the instant messaging window includes chat window 608 and a contact person list. The contact person list includes one or more zones, each of which includes a region of the contact person list associated with a particular contact person (a buyer user) that is currently connected to the seller user associated with the instant messaging client. In the example, the contact person list includes zone 602, zone 604, and zone 606, which respectively correspond to contact person 1, contact person 2, and contact person 3. Each zone (zone 602, zone 604, and zone 606) refers to an area of the contact person list that is reserved for displaying information associated with a particular connected buyer user. The seller user may send and receive instant messages with a contact person via chat window 608. Put another way, chat window 608 displays the contents of an instant messaging session between the seller user and a selected contact person. For example, the seller user may select zone 602 associated with contact person 1 to chat with contact person 1 in chat window 608 and the seller user may select zone 604 associated with contact person 2 to chat with contact person 2 in chat window 608. As shown in the example, the current transaction status information received for a contact person is displayed within the zone associated with that contact person. This way, the seller user using the instant messaging window can easily determine the current transaction status information of a buyer user with which it is communicating over the instant messaging service. The instant messaging client may periodically send a query request for the latest transaction status information corresponding to a contact person so that the displayed transaction status information will be the most up-to-date progress of the order fulfillment process.

For example, if the seller user has a large promotional activity (e.g., all products sold by the seller user are 20% off), then due to the interest generated by the promotional activity, the seller user may be simultaneously connected to several contact persons within a very short period of time. Typically, the instant messaging client does not display (or has received transaction status information) corresponding to the connected contact persons and so the seller user will not be able to immediately know the current transaction progress of each connected contact person. While the seller user could manually send queries to the transaction server to determine the current transaction status information of each connected contact person, the process would be very time consuming and inefficient. Without knowing the current transaction progress of each connected contact person, the seller user may not know how to prioritize which contact person to chat with and/or what to communicate to each contact person.

As such, assigning each contact person a zone within the instant messaging window such as shown in the example of FIG. 6 is designed to help the seller user quickly learn the current transaction status information associated with each contact person with just a glance to the zone associated with that contact person.

FIG. 7 is a diagram showing a second embodiment of displaying the transaction status information corresponding to various contact persons by an instant messaging client. In some embodiments, 506 of process 500 of FIG. 5 is implemented using the embodiment described in FIG. 7.

The example in FIG. 7 shows an instant messaging window that is provided by an instant messaging client. The instant messaging window shown in the example represents at least a portion of the user interface associated with the instant messaging client. For example, the instant messaging client is executing at a client user's (a seller user's) client device. As shown in the example, the instant messaging window includes chat window 702, a contact person list, and contact person descriptive zone 704. The contact person list of the example of FIG. 7 is similar to that of the example of FIG. 6 in that each contact person is associated with a zone of the contact person list. However, in the contact person list of the example of FIG. 7, the current transaction status information is not displayed within the zone associated with each contact person. Instead, the current transaction status information of a contact person is displayed within contact person descriptive zone 704 when the seller user selects to chat with that contact person in chat window 702 (e.g., by selecting the zone associated with that contact person within the contact person list). The example shown in FIG. 7 enables the seller user to quickly determine the current transaction status information of whichever contact person the seller user is currently chatting with in chat window 702. The instant messaging client may periodically send a query request for the latest transaction status information corresponding to a contact person so that the displayed transaction status information will be the most up-to-date progress of the transaction.

FIG. 8 is a diagram showing a third embodiment of displaying the transaction status information corresponding to various contact persons by an instant messaging client. In some embodiments, 506 of process 500 of FIG. 5 is implemented using the embodiment described in FIG. 8. The example of FIG. 8 includes an instant messaging window that is a combination of the examples of FIG. 6 and FIG. 7. As such, the example instant messaging window of FIG. 8 includes a contact person list with a zone associated with each contact person and the current transaction status information of that contact person. Furthermore, the instant messaging window also includes the contact person descriptive zone, which includes the transaction status information of the contact person with whom the seller user is currently communicating within the chat window. Thus, the example of FIG. 8 allows the seller user to both see the current transaction information of each contact person in the contact person list and also the current transaction information of the contact person with whom the seller user has selected to chat with in the chat window.

Figure 9:
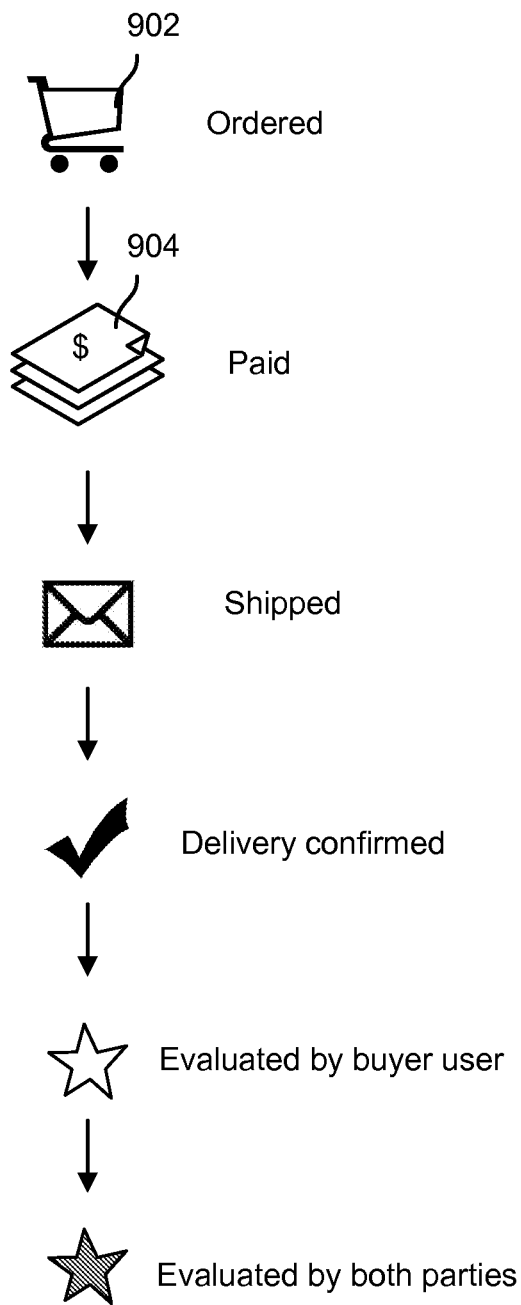
FIG. 9 is a diagram of icons to display for various stages of the order fulfillment process.

FIG. 9 is a diagram of icons to display for various stages of the order fulfillment process. The transaction status information corresponding to a contact person describes the stage of the order fulfillment process associated with the order made by the contact person with a seller user. As described above, various stages of the order fulfillment process may include the following: Ordered→Paid→Shipped→Delivery confirmed→Evaluated by a buyer user→Evaluated by both parties. The example of FIG. 9 shows a different icon to represent each of these stages. For example, icon 902 represents the transaction status information of "Ordered" and icon 904 represents the transaction status information of "Paid." The icons shown in the example are merely examples and other images may be used to represent any of the stages of the order fulfillment process. For example, an icon comprises a type of graphic marking format and can be associated with the filename extension of *.icon or *.ico.

The icons shown in the example of FIG. 9 may be used to represent the current transaction status information of contact persons in the instant messaging windows of the examples of FIGS. 6, 7, and/or 8. By using icons to represent various stages of the order fulfillment process, the seller user may instantly recognize the current transaction status information associated with a contact person based on the icon displayed with that contact person. For example, in displaying an icon to represent a particular stage of the order fulfillment process, when a user's operation moves into the area of the display over or around the icon, the text describing that stage (e.g., Ordered, Paid, Shipped, Delivery confirmed, Evaluated by a buyer user, or Evaluated by both parties) may be displayed. Once the user's operation moves out of the area over or around the icon, then the text is no longer displayed. Examples of a user's operation may include an operation associated with a mouse, a keyboard, or a touchscreen.

Figure 10:
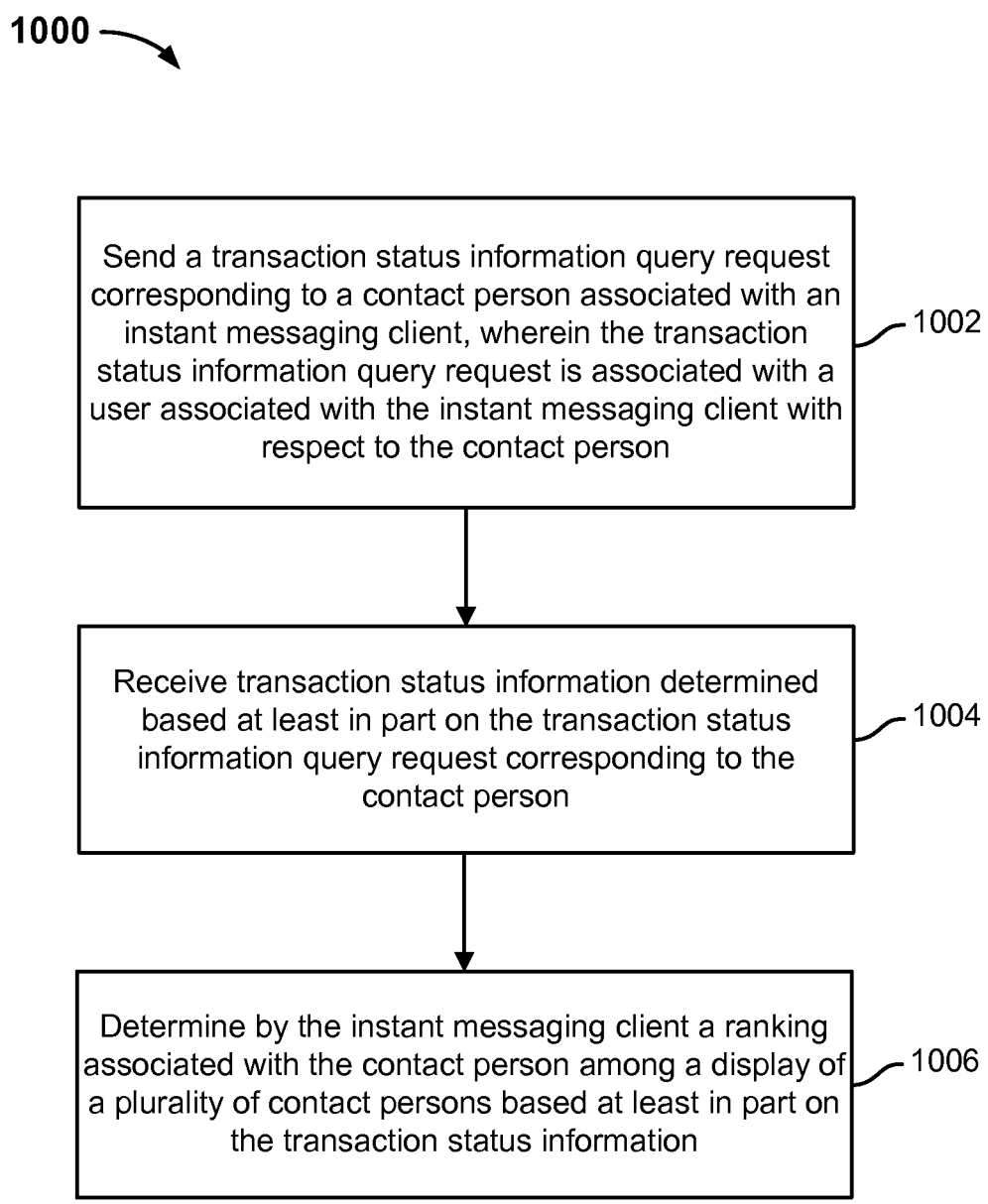
FIG. 10 is a flow diagram showing an embodiment of a process for determining transaction status information.

FIG. 10 is a flow diagram showing an embodiment of a process for determining transaction status information. In some embodiments, process 1000 is implemented at system 100 of FIG. 1.

Process 1000 is similar to process 200 of FIG. 2 but includes an additional technique of determining a ranking associated with a contact person among other contact persons based on the priorities associated with their corresponding current transaction status information.

At 1002, a transaction status information query request corresponding to a contact person associated with an instant message client is sent, wherein the transaction status information query request is associated with a user associated with the instant messaging client with respect to the contact person. For example, a query request may be sent by the instant messaging client for each connected contact person.

At 1004, transaction status information determined based at least in part on the transaction status information query request corresponding to the contact person is received. The transaction status information associated with each connected contact person is received.

At 1006, a ranking associated with the contact person among a display of a plurality of contact persons is determined by the instant messaging client based at least in part on the transaction status information. In some embodiments, a priority may be assigned (e.g., by a system administrator) to each stage of the order fulfillment process. Thus, different transaction status information is associated with different priorities. For example, the priority of a particular stage of the order fulfillment process may be set from the perspective of the seller user. In a specific example, a high-to-low priority for the transaction status information may be assigned as follows: Evaluated by both users>Evaluated by the buyer user>Delivery confirmed>Shipped>Paid>Ordered>No transaction status information, where "No transaction status information" indicates that transaction status information has not been received for the corresponding connected contact person.

As such, a contact person is given the priority of the current transaction status information received for that contact person. Prior to displaying information associated with the contact person in the contact person list of the instant messaging window, the contact persons to be displayed may be ranked based on their respective priorities (as determined from their current transaction status information). For example, a contact person with a higher priority may be ranked higher than another contact person with a lower priority in the contact person list. For example, assume that the seller user connects to 100 contact persons within a very short period of time. Within the contact person list, initially, the 100 contact persons may each receive a default ranking based on respective connection times. Later, when the transaction status information is received for the connected contact person, then the ranking in which the connected contact persons is displayed in the contact person list is based on the received transaction status information. Ranking the contact persons in the contact person list based on priority may help the seller user identify which buyer users to chat with first and/or what to communicate to them. As updated transaction status information is received for the contact persons, their respective rankings in the contact person list may also be updated.

Figure 11:
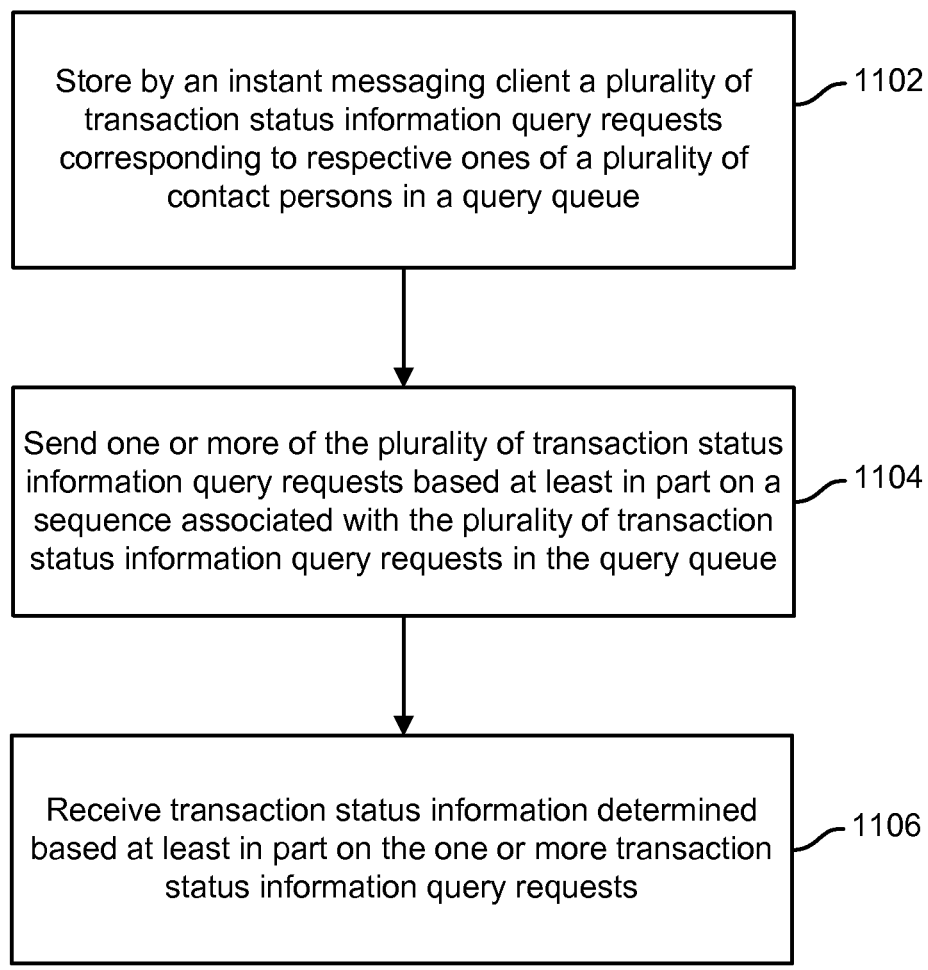
FIG. 11 is a flow diagram showing an embodiment of a process for determining transaction status information.

FIG. 11 is a flow diagram showing an embodiment of a process for determining transaction status information. In some embodiments, process 1100 is implemented at system 100 of FIG. 1.

Process 1100 is similar to process 200 of FIG. 2 but includes an additional technique of enabling the instant messaging client to place transaction status information query requests that correspond to various contact persons in a query queue and to send the query requests based on the sequence of the query requests in the query queue.

At 1102, a plurality of transaction status information query requests corresponding to respective ones of a plurality of contact persons are stored by an instant messaging client in a query queue.

At 1104, one or more of the plurality of transaction status information query requests are sent based at least in part on a sequence associated with the plurality of transaction status information query requests in the query queue.

At 1106, transaction status information determined based at least in part on the one or more transaction status information query requests is received.

Process 1100 may be particularly useful when the seller user is connected to numerous contact persons. For example, if the seller user has a large promotional activity, then due to the interest generated by the promotional activity, the seller user may be simultaneously connected to several contact persons within a very short period of time. However, given the large number of connected contact persons, if the instant messaging client were to send a transaction status information query request to the transaction server or the instant messaging server for each contact person concurrently and/or within a short period of time, then the transaction server or the instant messaging server may be suddenly inundated with too many query requests to process, which could cause the transaction server or the instant messaging server to process the query requests inefficiently.

To avoid having the instant messaging client send too many transaction status information query requests to the transaction server and/or instant messaging server concurrently or within a short period of time, the query requests may be organized in a query queue managed by the instant messaging client. By placing the query requests in the query queue, when and which query requests are to be sent by the instant messaging client may be determined based on the sequence that the query requests are arranged in the query queue. For example, the query queue may be stored in a request database. In some embodiments, the instant messaging client may fetch a subsequent query request from the query queue at every configured interval (e.g., 30 seconds) to send to the transaction server or instant messaging server.

For example, the query queue may be implemented using number sets, queues, stacks, and/or linked lists. In some embodiments, the query queue may be implemented using techniques other than those described herein. In some embodiments, the query requests of the query queue may be arranged in a sequence based on first in, first out. In the first in, first out scheme, a new transaction status information query request may be added to the back of the query queue whenever a new contact person connects to the seller user. For instance, the new transaction status information query request may be added to the end of the queue using a "queue-in" operation. Once a transaction status information query request from the top of the queue has been sent to the transaction server or the instant messaging server, the transaction status information query request may be removed from the queue using a "queue-out" operation. The first in, first out scheme may be implemented based on the corresponding connection times of the query requests. Therefore, a query request corresponding to a contact person associated with an earlier connection time to the seller user would be arranged closer to the front of the queue than another query request corresponding to another contact person associated with a later connection time. Furthermore, a new transaction status information query request may be generated periodically for a contact person and added to the back of the queue so that the updates to the transaction status information corresponding to the contact person may be determined over time.

In some embodiments, the sequence of query requests in the query queue may be adjusted based on received transaction status information associated with the contact persons corresponding to the query requests pushed by the transaction server or the instant messaging server. In various embodiments, information that is "pushed" by an instant messaging server or by a transaction server is information that is sent by the server without a trigger of a transaction status information query request sent from the instant messaging client. For example, the query requests in the query queue may be initially arranged based on a first in, first out scheme. Then when transaction status information associated with the contact persons corresponding to the query requests is pushed by the transaction server or the instant messaging server to the instant messaging client, the instant messaging client may adjust the sequence of the query requests in the query queue based on the received information. Below is an example describing adjusting the sequence of the query requests in the query queue based on the information pushed from a transaction server or an instant messaging server:

In this example, assume that the seller user's instant messaging client has connected to 200 contact persons and that the instant messaging client has queued transaction status information query requests for these 200 contact persons one-by-one in the sequence in which they connected to the instant message client. Assume that the current order of the contact persons whose associated query requests are in the query queue is contact person 1, contact person 2, contact person 3, . . . , contact person 200. Assume that at this time, the messaging client has just sent requests corresponding to contact person 1 through contact person 20, and that the query requests for contact person 21 through contact person 200 have not yet been sent. However, at this time the instant messaging server has received, from the transaction server or the instant messaging server, transaction status information associated with the client user and contact person 100. For example, the received transaction status information indicates that contact person 100 has just ordered a certain product sold by the client user and is waiting to pay.

In some embodiments, the transaction server or the instant messaging server may actively push recently updated transaction status information corresponding to a seller user to the instant messaging client associated with that seller user. For example, at least one of the transaction server and the instant messaging server is configured to push recently updated transaction status information corresponding to a seller user to an instant messaging client associated with that seller user. For example, which types of updates/changes to the transaction status information associated with a seller user with respect to a contact person that triggers pushing of such information to the instant messaging client may be configured (e.g., by a system administrator). For example, a change in the transaction status information associated with a seller user with respect to a contact person that causes the changed transaction status information to become more important (e.g., of a higher priority) to the seller user may be configured to cause such information to be pushed. For instance, the change may be that the transaction status information has changed from "Ordered" to "Paid." Due to the changed transaction status information being pushed to the instant messaging client, the instant messaging client may move a transaction query request corresponding to the contact person identified in the received transaction status information up in the query queue so that the query queue would be sent out sooner. Therefore, the moved up query request may sooner return another updated transaction status information corresponding to the contact person that is of interest to the seller user.

Returning to the previous example, if the transaction status information received from a transaction server or an instant messaging server at the instant messaging client for the seller user and contact person 100 is "Ordered," then the instant messaging client may move the query request associated with contact person 100 up in the queue so that it will be sent sooner than if it had not been moved up. Due to moving the query request up in the query queue, it will thus be possible to more promptly receive the next update in the transaction status information corresponding to contact person 100, which will correspond to "Paid."

When the client user closes the instant messaging window for a connected contact person or deletes a connected contact person from the contact person list, the corresponding connected contact person may be removed from the list of contact persons. If a contact person is removed from the contact person list, any one or more corresponding transaction status information query requests for the contact person may also be deleted from the query queue.

Figure 12:
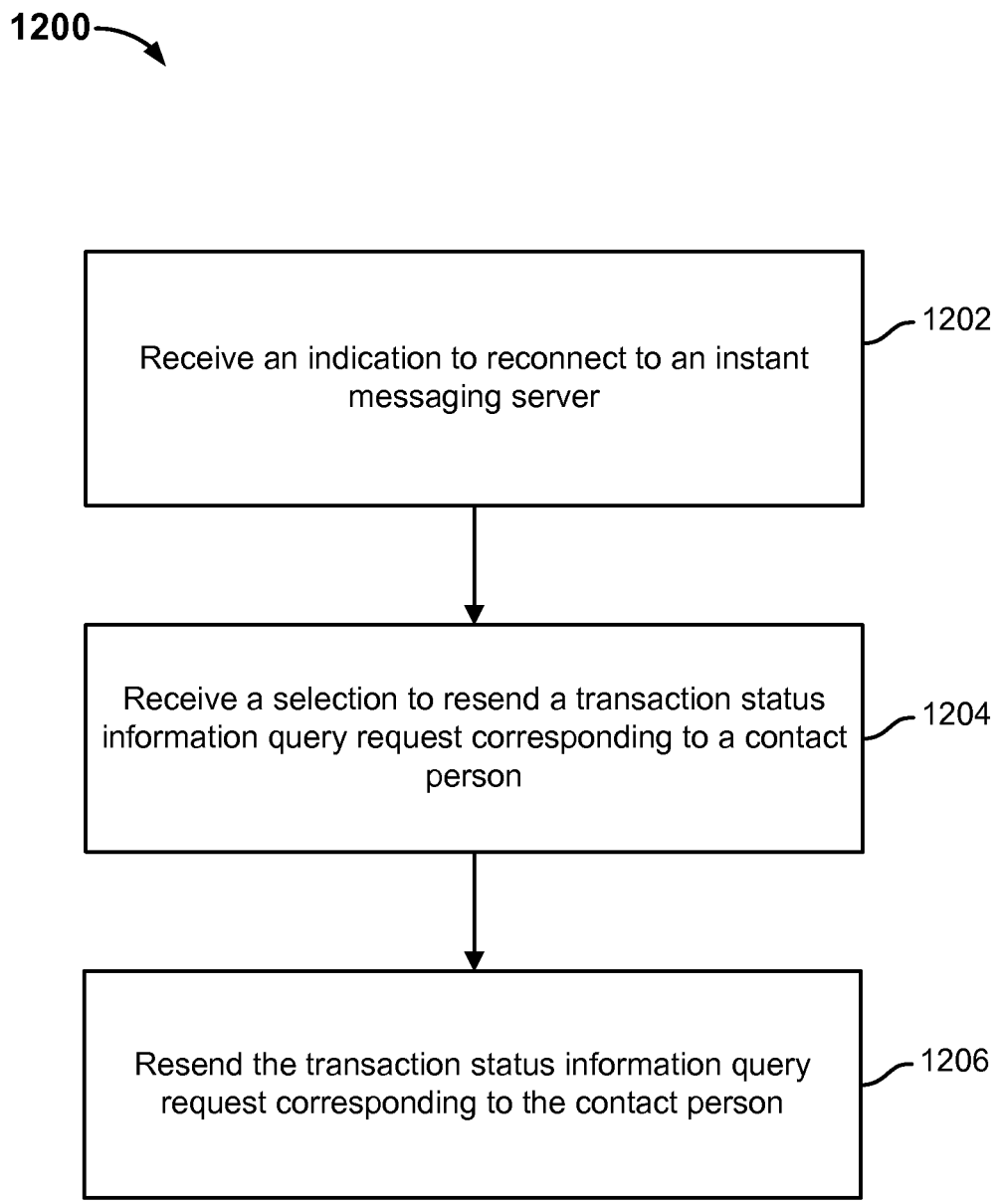
FIG. 12 is a flow diagram showing an embodiment of a process for determining transaction status information.

FIG. 12 is a flow diagram showing an embodiment of a process for determining transaction status information. In some embodiments, process 1200 is implemented at system 100 of FIG. 1.

Process 1200 describes embodiments in which the connections between a seller user and one or more contact persons are interrupted by a disconnection of the seller user's instant messaging client to the Internet/instant messaging server.

At 1202, an indication to reconnect to an instant messaging server is received. If the instant messaging client's connection to the instant messaging server is unexpectedly broken, the account associated with the seller user will no longer be logged onto the instant messaging service. The instant messaging client will save contact person related transaction status information that it previously received in memory. Later, the instant messaging client is prompted by the seller user to reconnect to the instant messaging server. Once the instant messaging client is connected to the instant messaging server once again, it will display the previously received transaction status information corresponding to various contact persons in the instant messaging window.

However, sometimes, responses to some transaction status information query requests corresponding to various contact persons that were sent prior to the interruption to the instant messaging client's connection to the instant messaging server are not received by the instant messaging client (e.g., because the responses were sent to the instant messaging client while the instant messaging client was offline). In some embodiments, the transaction server and/or the instant messaging server are configured to temporarily store the transaction status information that was not received by the offline instant messaging client and to push such transaction status information to the instant messaging client when the server detects that the instant messaging client has successfully reconnected to the instant messaging server. However, having the transaction server and/or the instant messaging server store the transaction status information consumes a great amount of resources of the transaction server and/or the instant messaging server and may therefore not be desirable in some instances.

In some embodiments, if the transaction server and/or the instant messaging server are not configured to temporarily store the transaction status information, then after the instant messaging client has successfully reconnected to the instant messaging server, the instant messaging client may resend all the transaction status information query requests for which it has not yet received responses. However, resending a large number of transaction status information query requests to a transaction server or an instant messaging server may also consume a great amount of resources of the transaction server and/or the instant messaging server and may therefore be not desirable in some instances.

At 1204, a selection to resend a transaction status information query request corresponding to a contact person is received. In some embodiments, after the instant messaging client has successfully reconnected to the instant messaging server, the instant messaging client does not resend all the transaction status information query requests for which it has not yet received responses. Instead, the instant messaging client is configured to receive selections associated with contact persons from the client user (e.g., the seller user) via a user interface that the client user wishes that the instant messaging client to resend transaction status information query requests to. This way, the instant messaging client may potentially need to resend fewer than all the transaction status information query requests for which it has not yet received responses.

At 1206, the transaction status information query request corresponding to the contact person is resent.

For example, prior to the instant messaging client losing connection to the instant messaging server, the instant messaging client had sent transaction status information query requests corresponding to contact persons 1, 2, 3, 10, 40 and 56, but has not received the corresponding transaction status information for any of such contact persons. If, prior to the instant messaging client logging back on to the instant messaging service, the client user wishes to view the transaction status information for contact person 3 and contact person 56, the client user can select to add contact person 3 and contact person 56 to the contact person list of the instant messaging window. Then, transaction status information query requests corresponding to contact persons 3 and 56 may be resent by the instant messaging client after the instant messaging client has successfully connected to the instant messaging server. Thus, the instant messaging client receives the transaction status information sent back based on such resent transaction status information query requests.

In some embodiments, the transaction server or instant messaging server may actively push transaction status information to an instant messaging client when updates are made to such information. As described above, pushing transaction status information by a transaction server or by an instant messaging server is performed without a trigger such as a transaction status information query request from an instant messaging client. For example, the transaction server or instant messaging server can monitor transaction status information of the client user with respect to one or more contact persons. If the transaction server or the instant messaging server detects that a change has occurred, then it can actively push the changed transaction status information of the corresponding contact person to the instant messaging client of the client user.

For example, assume that an instant messaging client is connected to 200 contact persons. Assume that the instant messaging client has sent query requests corresponding to contact persons 1 through 20, but has not yet sent a request to contact persons 21 through 200. At this point, the instant messaging server detects that there is a change in the transaction status information for the client user with respect to contact person 100. For example, contact person 100 has just ordered a certain product sold by the client user and is waiting to pay. Thus, the instant messaging server may actively push the recently changed transaction status information for contact person 100 to the instant messaging client.

In some embodiments, the instant messaging client may display transaction status information query requests corresponding to only connected contact persons (and not for non-connected contact persons). For example, assume that an instant messaging client only has 20 connected contact persons. Even if the instant messaging server actively pushes the transaction status information of 100 different contact persons, the instant messaging client may display only the transaction status information for the 20 contact persons that are currently connected to the client user and not display the transaction status information for the other 80 contact persons who are not currently connected to the client user.

In some embodiments, both the instant messaging client is configured to send transaction status information query requests to the transaction server or the instant messaging server and either the transaction server and the instant messaging server is configured to push transaction status information to the instant messaging client. For example, the instant messaging client may send transaction status information query requests corresponding to the connected contact persons once. Then, after receiving the transaction status information query requests from the instant messaging client, either the transaction server or the instant messaging server may continue to push the latest transaction status information associated with the client user and a connected contact person associated with a previous query request whenever it detects a change in the corresponding transaction status information.

FIG. 13 is a flow diagram showing an embodiment of a process for determining transaction status information. In some embodiments, process 1300 is implemented at system 100 of FIG. 1.

Process 1300 provides an example of an instant messaging server determining transaction status information corresponding to various contact persons associated with a client user.

At 1302, a transaction status information query request corresponding to a contact person sent by an instant messaging client is received at an instant messaging server, wherein the transaction status information query request is associated with a user associated with the instant messaging client with respect to the contact person. The transaction status information query request includes identifying information associated with the client user of the instant messaging client and identifying information of a contact person.

At 1304, transaction status information corresponding to the contact person is determined based at least in part by querying a transaction status database. The instant messaging server can obtain transaction status information by querying the transaction status database using the identifying information associated with the client user of the instant messaging client and identifying information of a contact person included in each transaction status information query request.

At 1306, transaction status information determined based at least in part on the transaction status information query request is sent by the instant messaging server to the instant messaging client.

In one embodiment, the instant messaging server forwards the transaction status information query request that it receives to the transaction server. The instant messaging server then receives the appropriate transaction status information obtained by the transaction server through a transaction status database (maintained by the transaction server) using the identifying information associated with the client user of the instant messaging client and identifying information of a contact person included in each transaction status information query request.

In a second embodiment, a separate transaction status database is maintained and/or is easily accessible by the instant messaging server. As described for process 400 of FIG. 4 above, the information stored in the transaction status database maintained by the instant messaging server is determined by having the instant messaging server periodically send a batch of information query requests to the transaction server and then store the transaction status information sent back by the transaction server in response to the query requests with the corresponding identifying information of the seller user and the buyer users in the local transaction status database maintained by the instant messaging server. Then the instant messaging server may process transaction status information query requests that it receives using the local transaction status database.

The two embodiments described above may be used individually, in combination, or as fallbacks for each other.

In some embodiments, after the instant messaging server receives the transaction status information query request corresponding to a contact person, the instant messaging server may continue to monitor the transaction status information associated with the client user identified in the query request and the contact person identified in the query request. When a change is determined for the transaction information, the identifying information of the client user is determined and the instant messaging client associated with that client user is determined. Then, the updated transaction status information is pushed to the instant messaging client.

In some embodiments, after the instant messaging server detects that the connection to an instant messaging client is lost, the instant messaging server stops sending back or pushing transaction status information to the instant messaging client. In some embodiments, the instant messaging server temporarily stores the transaction status information that was sent to an offline instant messaging client and sends the temporarily stored transaction status information to the instant messaging client when it is determined that the instant messaging client has reconnected to the instant messaging server.

Figure 14:
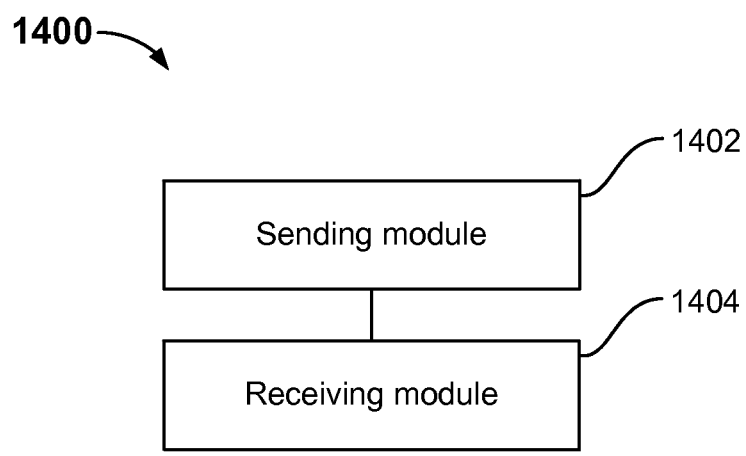
FIG. 14 is a diagram showing a system for an instant messaging client.

FIG. 14 is a diagram showing a system for an instant messaging client. In the example, instant messaging client 1400 includes sending module 1402 and receiving module 1404.

The modules and sub-modules can be implemented as software components executing on one or more processors, as hardware such as programmable logic devices and/or Application Specific Integrated Circuits designed as elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Sending module 1402 is configured to send transaction status information query requests corresponding to connected contact persons. A transaction status information query request is associated with a client user (the seller user) associated with the instant messaging client and a connected contact person (a buyer user who is currently connected to the seller user via the instant messaging service). A transaction status information query request includes identifying information associated with the client user and identifying information associated with a contact person.

Receiving module 1404 is configured to receive transaction status information determined based on transaction status information query requests. The transaction status information is determined by querying a transaction status database using the identifying information associated with the client user and identifying information associated with a contact person included in each transaction status information query request.

In some embodiments, sending module 1402 may further include:

A first sending sub-module that is configured to send transaction status information query requests corresponding to connected contact persons to one or more instant messaging servers.

Receiving module 1404 may further comprise:

A first receiving sub-module that is configured to receive transaction status information sent back by the one or more instant messaging servers based on the transaction status information query requests. The returned transaction status information is obtained by querying transaction status databases of the one or more instant messaging servers or of one or more transaction servers using identifying information associated with the client user and identifying information associated with various contact persons included in the query requests.

In some embodiments, sending module 1402 may further include:

A second sending sub-module that is configured to send transaction status information query requests corresponding to connected contact persons to one or more transaction servers.

Receiving module 1404 may further include:

A second receiving sub-module configured to receive transaction status information sent back by the one or more transaction servers based on the transaction status information query requests. The returned transaction status information is obtained by querying transaction status databases of the one or more transaction servers using identifying information associated with the client user and identifying information associated with various contact persons included in the query requests.

In some embodiments, instant messaging client 1400 may further include:

A first displaying module that is configured to display the received transaction status information in an instant messaging window associated with the instant message client.

A second displaying module that is configured to display the received transaction status information based on any relevant operations configured for the client user associated with the instant messaging client.

In some embodiments, instant messaging client 1400 may further include:

A first adjusting module that is configured to adjust the rankings of the connected contact persons in the display of the instant messaging window based on corresponding transaction status information.

In some embodiments, instant messaging client 1400 may further include:

A recording module that is configured to place the transaction status information query requests of connected contact persons into a query queue. In some embodiments, the query queue is stored in a requests database.

A sequence sending module that is configured to send transaction status information query requests fetched from the request database based on the sequence of the transaction status information query requests in the query queue.

In some embodiments, instant messaging client 1400 may further include:

A second sequence-adjusting module that is configured to adjust the sequence of the transaction status information query requests in the query queue based on corresponding received transaction status information that was pushed by the one or more transaction servers or the one or more instant messaging servers.

In some embodiments, instant messaging client 1400 may further include:

A contact person sending module that is configured to enable instant messaging clients to send transaction status information query requests corresponding to the contact persons in the contact person list of the instant messaging window.

Figure 15:
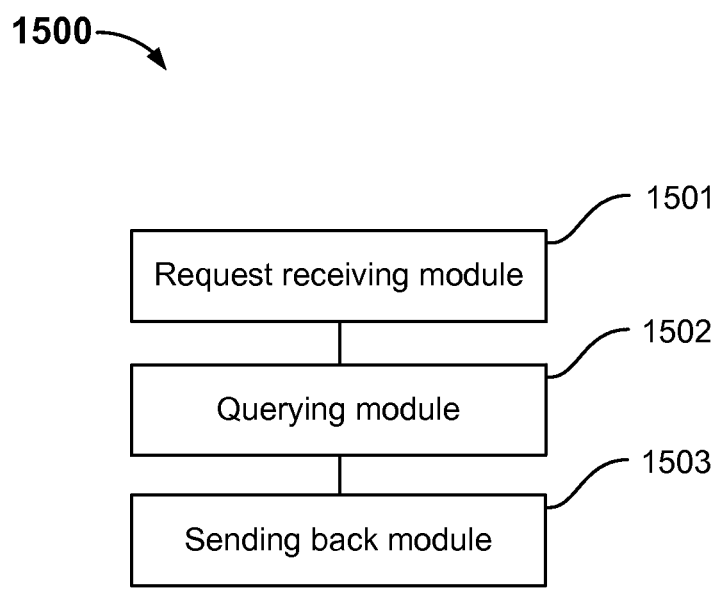
FIG. 15 is a diagram showing a system for an instant messaging client.

FIG. 15 is a diagram showing a system for an instant messaging client. In the example, instant messaging server 1500 includes request receiving module 1501, querying module 1502, and sending back module 1503.

Request receiving module 1501 is configured to receive transaction status information query requests from instant messaging clients.

Querying module 1502 is configured to obtain transaction status information by querying transaction status databases using identifying information associated with the client user and identifying information associated with various contact persons included in the query requests.

Sending back module 1503 is configured to send back to instant messaging clients the transaction status information obtained by querying one or more transaction status databases.

In some embodiments, instant messaging server 1500 may further include:

A forwarding sub-module that is configured to forward received transaction status information query requests to one or more transaction servers.

A receiving sub-module that is configured to receive transaction status information obtained by the one or more transaction servers querying transaction status databases using identifying information associated with the client user and identifying information associated with various contact persons included in the query requests.

In some embodiments, querying module 1502 is further configured to:

Obtain transaction status information by querying one or more transaction status databases maintained by one or more instant messaging servers using identifying information associated with the client user and identifying information associated with various contact persons included in the query requests.

In some embodiments, instant messaging server 1500 may further include: a database creating module configured to create and maintain one or more transaction status databases associated with one or more instant messaging servers.

The database creating module may include:

A query sending sub-module that is configured to send information query requests to transaction servers, wherein such information query requests carry IDs of seller users.

An information receiving sub-module that is configured to receive transaction status information sent back by the one or more transaction servers based on the information query requests.

A saving sub-module that is configured to store transaction status information and corresponding identifying information associated with the client user and identifying information associated with various contact persons to the one or more transaction status databases associated with the one or more instant messaging servers.

In some embodiments, instant messaging server 1500 may further include a transaction status information pushing module, which may include:

A monitoring sub-module that is configured to monitor whether transaction status information associated with a client user and a contact person has changed.

A determining sub-module that is configured to determine when changes are detected in transaction status information and the identifying information of the affected client user based on the changed transaction status information.

A pushing sub-module that is configured to push the transaction status information to the instant messaging client corresponding to the identifying information of the client user determined by the determining sub-module.

A person skilled in the art should understand that the embodiments of the present application can be provided as methods, systems or computer software products. Therefore, the present application can take the form of embodiments consisting entirely of hardware, embodiments consisting entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, equipment (systems) and computer program products of its embodiments. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on specially-operating computer-readable storage devices that can guide computers or other programmable data processing equipment, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application.

Each of the embodiments contained in this description is described in a progressive manner, the explanation of each embodiment focuses on areas of difference from the other embodiments, and the descriptions thereof may be mutually referenced for portions of each embodiment that are identical or similar.

This document has employed specific embodiments to expound the principles and forms of implementation of the present application. The above embodiment explanations are only meant to aid in comprehension of the methods of the present application and of its core concepts. Moreover, a person with general skill in the art would, on the basis of the concepts of the present application, be able to make modifications to specific applications and to the scope of applications. To summarize the above, the contents of this description should not be understood as limiting the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
detect, by a server, that an instant messaging connection has been established between a first device associated with a contact person associated with an instant messaging client and a second device associated with a user associated with the instant messaging client;
in response to the detection that the instant messaging connection has been established:
use the instant messaging client to obtain identifying information associated with the contact person from a contact list associated with the instant messaging client; and
use the instant messaging client to automatically send a transaction status information query request to a database storing transaction status information,
wherein the transaction status information query request includes identifying information associated with the user associated with the instant messaging client and the identifying information associated with the contact person,
wherein the transaction status information query request is used to look up in the database storing transaction status information a set of transaction status information that identifies a transaction between the user associated with the instant messaging client and the contact person;
receive the set of transaction status information, wherein the received set of transaction status information describes a current stage in a fulfillment process of an order; and
send the received set of transaction status information and the identifying information associated with the contact person to the second device associated with the user associated with the instant messaging client for the second device to present a display comprising the received set of transaction status information and the identifying information associated with the contact person within an instant messaging window that is provided by the instant messaging client; and
one or more memories coupled to the one or more processors and configured to provide instructions to the one or more processors.

2. The system of claim 1, wherein the user associated with the instant messaging client comprises a seller user.

3. The system of claim 1, wherein the contact person comprises a buyer user.

4. The system of claim 1, wherein the received set of transaction status information describes the current stage associated with the fulfillment process associated with the order placed by the contact person for a product sold by the user associated with the instant messaging client.

5. The system of claim 1, wherein the received set of transaction status information indicates one of the following: ordered, paid, shipped, delivery confirmed, evaluated by a buyer user, and evaluated by both parties.

6. The system of claim 1, wherein the transaction status information query request is sent to a transaction server, and wherein the transaction server is configured to query the database storing transaction status information.

7. The system of claim 1, wherein the transaction status information query request is sent to an instant messaging server, and wherein the instant messaging server is configured to query a the database storing transaction status information.

8. The system of claim 1, wherein the transaction status information query request is sent to an instant messaging server, and wherein the instant messaging server is configured to forward the transaction status information query request to a transaction server configured to query the database storing transaction status information.

9. The system of claim 1, wherein the display comprising the received set of transaction status information is based at least in part on a priority associated with the received set of transaction status information.

10. The system of claim 1, wherein the one or more processors are further configured to determine a ranking associated with the contact person among a presentation of a plurality of contact persons based at least in part on the received set of transaction status information.

11. The system of claim 1, wherein the one or more processors are further configured to:
store a plurality of transaction status information query requests corresponding to respective ones of a plurality of contact persons in a query queue;
send one or more transaction status information query requests of the plurality of transaction status information query requests based at least in part on a sequence associated with the plurality of transaction status information query requests in the query queue; and receive sets of transaction status information determined based at least in part on the one or more transaction status information query requests.

12. The system of claim 1, wherein the transaction status information query request comprises a first transaction status information query request and wherein the one or more processors are further configured to:
receive an indication to reconnect the instant messaging client to an instant messaging server;
receive a selection to resend a second transaction status information query request corresponding to a selected contact person; and
resend the second transaction status information query request corresponding to the selected contact person.

13. A method, comprising:
detecting, by a server, that an instant messaging connection has been established between a first device associated with a contact person associated with an instant messaging client and a second device associated with a user associated with the instant messaging client;
in response to the detection that the instant messaging connection has been established:
using the instant messaging client to obtain identifying information associated with the contact person from a contact list associated with the instant messaging client; and
using the instant messaging client to automatically send a transaction status information query request to a database storing transaction status information,
wherein the transaction status information query request includes identifying information associated with the user associated with the instant messaging client and the identifying information associated with the contact person,
wherein the transaction status information query request is used to look up in the database storing transaction status information a set of transaction status information that identifies a transaction between the user associated with the instant messaging client and the contact person;
receiving the set of transaction status information, wherein the received set of transaction status information describes a current stage in a fulfillment process of an order; and
sending the received set of transaction status information and the identifying information associated with the contact person to the second device associated with the user associated with the instant messaging client for the second device to present a display comprising the received set of transaction status information and the identifying information associated with the contact person within an instant messaging window that is provided by the instant messaging client.

14. The method of claim 13, further comprising:
storing a plurality of transaction status information query requests corresponding to respective ones of a plurality of contact persons in a query queue;
sending one or more transaction status information query requests of the plurality of transaction status information query requests based at least in part on a sequence associated with the plurality of transaction status information query requests in the query queue; and
receiving sets of transaction status information determined based at least in part on the one or more transaction status information query requests.

15. The method of claim 13, wherein the transaction status information query request comprises a first transaction status information query request and further comprising:
receiving an indication to reconnect the instant messaging client to an instant messaging server;
receiving a selection to resend a second transaction status information query request corresponding to a selected contact person; and
resending the second transaction status information query request corresponding to the selected contact person.

* * * * *

UNITED STATES PATENT AND TRADEMARK OFFICE
CERTIFICATE OF CORRECTION

PATENT NO. : 9,842,364 B2  
APPLICATION NO. : 13/963823  
DATED : December 12, 2017  
INVENTOR(S) : Ke Hu Page 1 of 1

It is certified that error appears in the above-identified patent and that said Letters Patent is hereby corrected as shown below:

In the Claims

In Column 26, Claim 7, Line 41, after "query", delete "a".

Signed and Sealed this
Seventeenth Day of April, 2018

Andrei Iancu
*Director of the United States Patent and Trademark Office*